US006528962B1

(12) United States Patent
Igarashi et al.

(10) Patent No.: US 6,528,962 B1
(45) Date of Patent: Mar. 4, 2003

(54) CONTROL UNIT AND METHOD FOR CONTROLLING MOTOR FOR USE IN PRINTER, AND STORAGE MEDIUM STORING CONTROL PROGRAM

(75) Inventors: Hitoshi Igarashi, Nagano-ken (JP); Masanori Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 09/625,994

(22) Filed: Jul. 26, 2000

(30) Foreign Application Priority Data

Jul. 26, 1999 (JP) .......................................... 11-211076
May 15, 2000 (JP) ...................................... 2000-141661

(51) Int. Cl.[7] ............................ H02P 1/04; H02P 3/00; H02P 5/00

(52) U.S. Cl. ........................ 318/461; 318/268; 318/276

(58) Field of Search ................................ 318/254, 268, 318/276–277, 281–282, 287–288, 461; 388/800–804, 809, 811, 842–843

(56) References Cited

U.S. PATENT DOCUMENTS 3,863,118 A * 1/1975 Lander et al. .............. 318/254
4,103,216 A * 7/1978 Hayes ........................ 318/254
4,490,796 A * 12/1984 Bibgie et al. ............... 318/561
4,775,945 A * 10/1988 Cavill et al. ................ 318/569
5,533,166 A * 7/1996 Yoshida et al. ............. 388/811
5,748,206 A 5/1998 Yamane
5,834,912 A * 11/1998 Nakamura et al. .......... 318/268
6,049,182 A * 4/2000 Nakatani et al. ............ 318/254
6,111,384 A * 8/2000 Stagnitto .................... 388/815

FOREIGN PATENT DOCUMENTS

EP 0 807 528 11/1997

OTHER PUBLICATIONS

Patent Abstract of Japan, Publication No. 02147273, dated Jun. 6, 1990.

Patent Abstract of Japan, Publication No. 60118077, dated Jun. 25, 1985.

European Search Report, dated Dec. 21, 2000.

* cited by examiner

*Primary Examiner*—Marlon T. Fletcher
(74) *Attorney, Agent, or Firm*—Sughrue Mion, PLLC

(57) ABSTRACT

A control unit suppresses fluctuation in speed of a motor in a printer. The control unit has a speed detecting part for detecting the speed of the motor in a predetermined period $t_v$, and an average speed calculating part for calculating an average speed based on a current speed detected by the speed detecting part, and on a speed which has been detected n ($n \geqq 2$) periods $t_v$ before, $nt_v$ corresponding to substantially half period of the fluctuation in speed of the motor. The control unit also has a speed control part for controlling the speed of the motor based on a deviation of the average speed from a target speed of the motor.

15 Claims, 12 Drawing Sheets

CONTROL UNIT AND METHOD FOR CONTROLLING MOTOR FOR USE IN PRINTER, AND STORAGE MEDIUM STORING CONTROL PROGRAM

BACKGROUND OF THE INVENTION

1. Field of The Invention

The present invention relates generally to a control unit and method for controlling a motor for use in a printer, and a storage medium storing a control program. More specifically, the invention is used for controlling the speed of a motor for driving a carriage of a serial printer.

2. Description of Related Art

In a typical serial printer such as an ink jet printer, a recording head scans on a printing paper to print. This recording head is fixed to a carriage to move with the carriage. This carriage is driven by a DC (Direct Current) motor. The system for driving the carriage is as follows.

First, a timing belt is stretched at a predetermined tension between a driving pulley, which is fixed to the rotating shaft of the DC motor, and a driven wheel which is a companion to the driving pulley. The carriage is mounted on the timing belt. Thus, the carriage is driven by the rotation of the DC motor so as to move main scanning directions.

When the carriage is moving at a constant speed, i.e., when the DC motor is rotating at a constant speed, print is carried out.

Conventionally, the speed control for causing the speed of the DC motor to be a constant speed is carried out by a PID control based on the deviation of a detected actual speed from a target speed.

However, as shown in FIG. 13, a typical DC motor has a stator 210 and a rotor 220. The stator 210 comprises a yoke 210*a* and a magnetic pole 210*b*. The rotor 220 comprises a protruding portion 220*a* which serves as a magnetic pole of an electromagnet, and a coil 220*b* which is wound onto the base portion of the protruding portion 220*a*. The rotor 220 is designed to sequentially switch the polarity of the electromagnet by the operation of a commutator 230 and a brush 240. Therefore, the DC motor has the fluctuation in torque. Assuming that the number of phases of the DC motor (the number of coils, i.e., the number of the base portions of the protruding portions 220*a*) is p, the fluctuation in torque occurs 2p times while the DC motor makes one rotation. Furthermore, the number of phases of the DC motor is 3 in FIG. 13.

Therefore, in the serial printer using the DC motor for driving the carriage, there is a problem in that the speed of the carriage (i.e., the speed of the DC motor) fluctuates due to the fluctuation in torque of the DC motor to cause the dispersion between printed dots, so that it is not possible to carry out a precise print.

SUMMARY OF THE INVENTION

It is therefore an object of the present invention to eliminate the aforementioned problems and to provide a control unit and method for controlling a motor for use in a printer, which can suppress the fluctuation in speed of the motor, and a storage medium having a control program recorded therein for controlling a motor for use in a printer.

In order to accomplish the aforementioned and other objects, according to one aspect of the present invention, there is provided a control unit for controlling a motor for use in a printer, the control unit comprising: a speed detecting part for detecting the speed of a motor for use in a printer in a predetermined period $t_v$; an average speed calculating part for calculating an average speed using at least the current detected speed, which is detected by the speed detecting part, and a detected speed which has been detected n (≧2), which corresponds to substantially half period of the fluctuation in speed of the motor, before the timing in detecting the current detected speed; and a speed control part for controlling the speed of the motor on the basis of a speed deviation of the average speed, which is the output of the average speed calculating part, from a target speed of the motor.

Furthermore, assuming that the period of the fluctuation in speed of the motor is $T_v$, the number n used for calculating the average speed preferably meets the following expression.

$$T_v/(2t_v)-2 \leqq n < T_v/(2t_v)+2$$

The average speed calculating part preferably calculates an average speed of k+1 detected speeds from the current detected speed to a detected speed of k (n>k≧0) before, and k+1 detected speeds from a detected speed of n before to a detected speed of k+1 before.

The speed control part preferably has a differentiating element which operates on the basis of the speed deviation of the average speed from the target speed.

The speed control part may have a proportional element which operates on the basis of the speed deviation of the average speed from the target speed.

The speed detecting part may comprise an encoder for generating an output pulse in accordance with the rotation of the motor, and a speed calculating part for calculating the speed of the motor in a period of the output pulse on the basis of the output pulse of the encoder.

The motor may be a carriage motor for use in an ink jet printer, and the encoder may generate the output pulse in accordance with the movement of a carriage driven by the carriage motor via a pulley, which is mounted of the rotating shaft of the carriage motor, and via a timing belt which is driven by the pulley.

Preferably, assuming that the distance between adjacent slits of a code plate of the encoder is λ, that a pitch circle length of the pulley is L and that the number of phases of the motor is p, the n meets the following expression.

$$L/(4p\lambda) \leqq n < L/(4p\lambda)+2$$

The speed control part may further comprise: a second speed calculating part for calculating the speed of the motor in a second predetermined period on the basis of the output pulse of the encoder; a second average speed calculating part for calculating the average speed using at least the current calculated speed, which is calculated by the second speed calculating part, and a calculated speed which has been m (m≧2) before; and a second differentiating element which operates on the basis of a speed deviation of the output of the second average speed calculating part from the target speed.

The motor may be a DC motor.

According to another aspect of the present invention, there is provided a method for controlling a motor for use in a printer, the method comprising the steps of: detecting the speed of a motor for use in a printer in a predetermined period $t_v$; calculating an average speed using at least the current detected speed and a detected speed which has been detected n (≧2), which corresponds to substantially half period of the fluctuation in speed of the motor, before the timing in detecting the current detected speed; and controlling the speed of the motor on the basis of a speed deviation of the average speed from a target speed of the motor.

In this control method, assuming that the period of the fluctuation in speed of the motor is $T_v$, the number n used for calculating the average speed preferably meets the following expression.

$$T_v/(2t_v)-2 \leqq n < T_v/(2t_v)+2$$

Preferably, the step of controlling the speed of the motor controls the speed of the motor on the basis of the sum of the speed deviation and the output of a differentiating element which operates on the basis of the speed deviation.

According to a further aspect of the present invention, there is provided a computer-readable storage medium storing control program code for controlling a motor for use in a printer, comprising: first program code means for detecting the speed of a motor for use in a printer in a predetermined period $t_v$; second program code means for calculating an average speed using at least the current detected speed and a detected speed which has been detected n ($\geqq$2), which corresponds to substantially half period of the fluctuation in speed of the motor, before the timing in detecting the current detected speed; and third program code means for controlling the speed of the motor on the basis of a speed deviation of the average speed from a target speed of the motor.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

Figure 6:
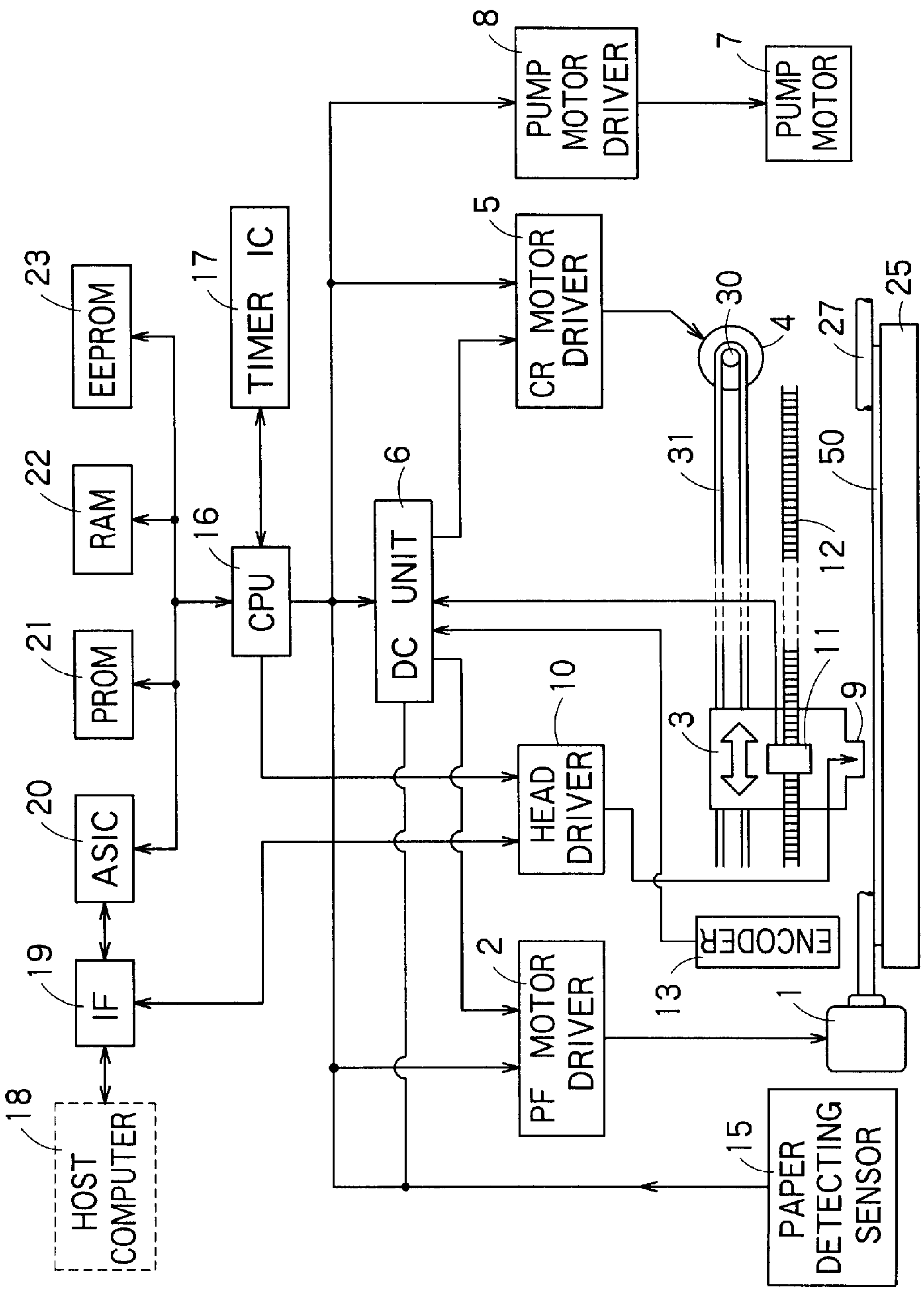
FIG. 6 is a block diagram schematically showing the construction of an ink jet printer.

First, the schematic construction and control of an ink jet printer, which uses a control unit for controlling a motor for use in a printer according to the present invention, will be described. The schematic construction of this ink jet printer is shown in FIG. 6.

This ink jet printer comprises: a paper feed motor (which will be also hereinafter referred to as a PF motor) 1 for feeding a paper; a paper feed motor driver 2 for driving the paper feed motor 1; a carriage 3; a carriage motor (which will be also hereinafter referred to as a CR motor) 4; a CR motor driver 5 for driving the carriage motor 4; a DC unit 6; a pump motor 7 for controlling the suction of ink for preventing clogging; a pump motor driver 8 for driving the pump motor 7; a recording head 9, fixed to the carriage 3, for discharging ink to a printing paper 50; a head driver 10 for driving and controlling the recording head 9; a linear type encoder 11 fixed to the carriage 3; a code plate 12 which has slits in regular intervals; a rotary type encoder 13 for use in the PF motor 1; a paper detecting sensor 15 for detecting the position of the rear edge of a paper which is being printed; a CPU 16 for controlling the whole printer; a timer IC 17 for periodically generating an interruption signal to output the signal to the CPU 16; an interface part (which will be also hereinafter referred to as an IF) 19 for transmitting/receiving data to/from a host computer 18; an ASIC 20 for controlling the printing definition, the driving waveform of the recording head 9 and so forth on the basis of printing information which is fed from the host computer 18 via the IF 19; a PROM 21, RAM 22 and EEPROM 23 which are used as working and program storing regions for the ASIC 20 and the CPU 16; a platen 25 for supporting the paper 50 during print; a carrier roller 27, driven by the PF motor 1, for carrying the printing paper 50; a pulley 30 mounted on the rotating shaft of the CR motor 4; and a timing belt 31 driven by the pulley 30.

Furthermore, the DC unit 6 is designed to drive and control the paper feed motor driver 2 and the CR motor driver 5 on the basis of a control command, which is fed from the CPU 16, and the outputs of the encoders 11 and 13. In addition, each of the paper feed motor 1 and the CR motor 4 comprises a DC motor.

Figure 7:
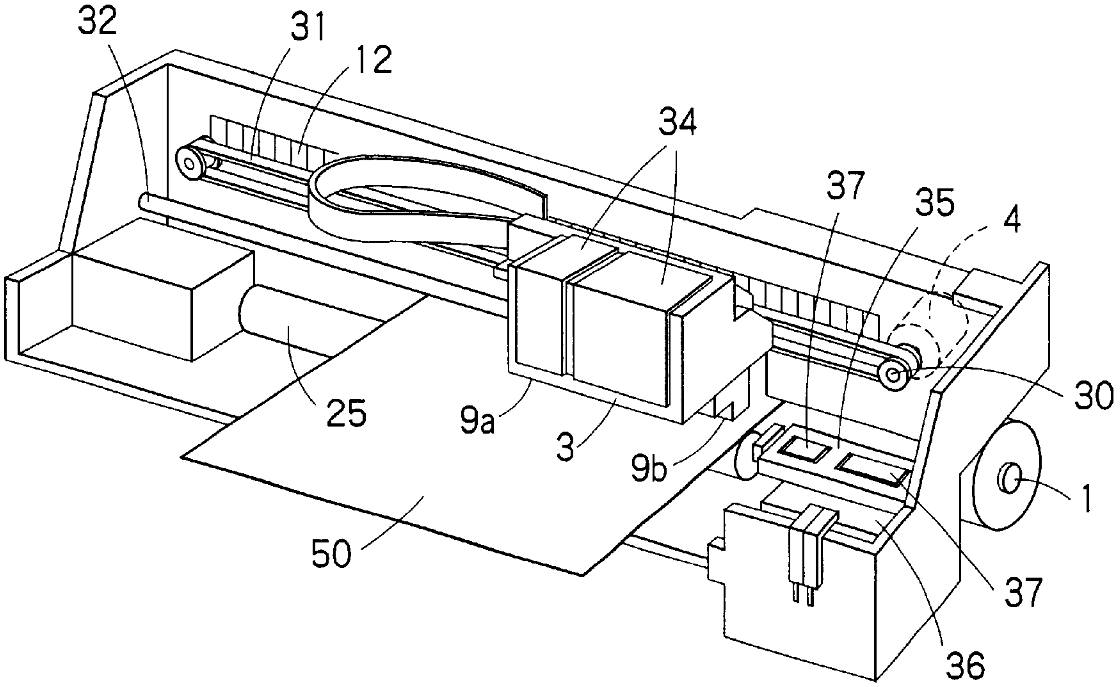
FIG. 7 is a perspective view showing the peripheral construction of a carriage.

The peripheral construction of the carriage 3 of this ink jet printer is shown in FIG. 7.

The carriage 3 is connected to the carriage motor 4 via the timing belt 31 and the pulley 30 to be driven so as to be guided by a guide member 32 to move in parallel to the platen 25. The carriage 3 is provided with the recording head 9 on the surface facing the printing paper. The recording head 9 comprises a nozzle row for discharging a black ink and a nozzle row for discharging color inks. Each nozzle is supplied with ink from an ink cartridge 34, and discharges drops of ink to the printing paper to print characters and/or images.

In a non-print region of the carriage 3, there are provided a capping unit 35 for sealing a nozzle opening of the recording head 9 during non-print, and a pump unit 36 having the pump motor 7 shown in FIG. 6. When the carriage 3 moves from a print region to the non-print region, the carriage 3 contacts a lever (not shown) to move the capping unit 35 upwards to seal the recording head 9.

When the nozzle opening row of the recording head 9 is clogged with ink, or when the cartridge 34 is exchanged or the like to force the recording head 9 to discharge ink, the pump unit 36 is operated in the sealed state of the recording head 9, to suck ink out of the nozzle opening row by a negative pressure from the pump unit 36. Thus, dust and paper powder adhering to a portion near the nozzle opening row are cleaned. Moreover, bubbles of the recording head 9, together with ink, are discharged to a cap 37.

Figure 8:
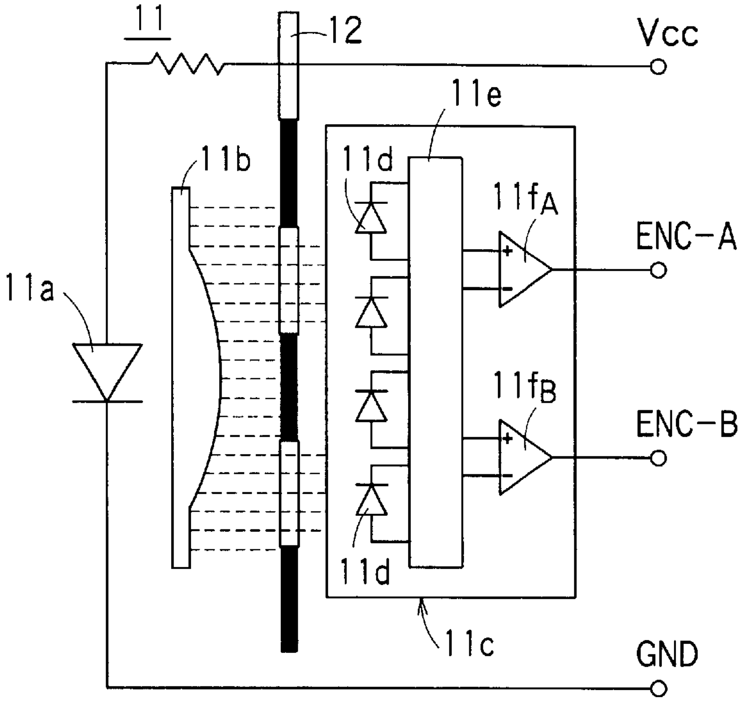
FIG. 8 is a schematic view showing the construction of a linear type encoder.

Then, the construction of the linear type encoder 11 mounted on the carriage 3 is shown in FIG. 8. This encoder 11 comprises a light emitting diode 11*a*, a collimator lens 11*b*, and a detection processing part 11*c*. The detection processing part 11*c* has a plurality of (four) photodiodes 11*d*, a signal processing circuit 11*e*, and two comparators $11f_A$ and $11f_B$.

If a voltage Vcc is applied between both ends of the light emitting diode 11*a* via a resistor, light rays are emitted from the light emitting diode 11*a*. The light rays are collimated by the collimator lens 11*b* to pass through the code plate 12. The code plate 12 is provided with slits at regular intervals (e.g., every 1/180 inches (=1/180×2.54 cm)).

The parallel rays passing through the code plate 12 are incident on each of the photodiodes 11*d* via a fixed slit (not shown), and converted into electric signals. The electric signals outputted from the four photodiodes 11*d* are processed by the signal processing circuit 11*e*. The signals outputted from the signal processing circuit 11*e* are compared by the comparators $11f_A$, and $11f_B$, and the compared results are outputted as pulses. The pulses ENC-A and ENC-B outputted from the comparators $11f_A$ and $11f_B$ are outputs of the encoder 11.

Figure 9:
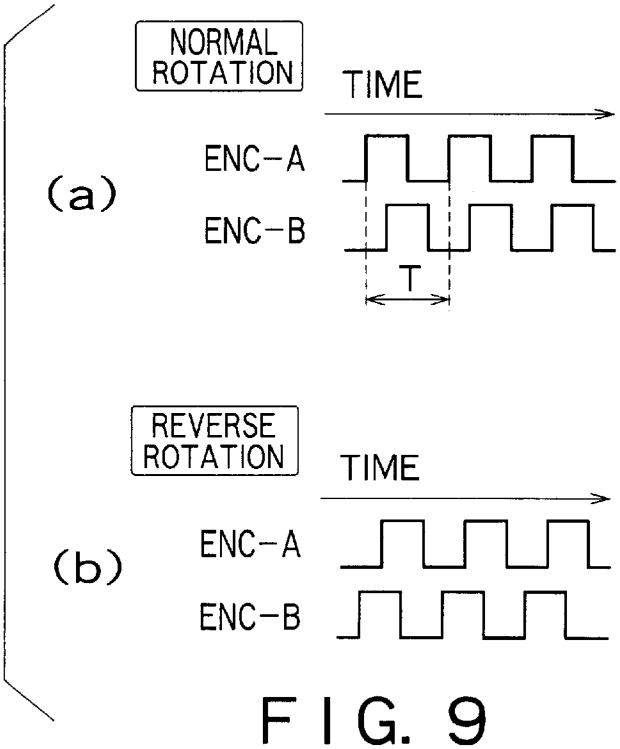
FIGS. 9(*a*) and 9(*b*) are waveform illustrations of output pulses of an encoder.

The phase of the pulse ENC-A is different from the phase of the pulse ENC-B by 90 degrees. The encoder 4 is designed so that the phase of the pulse ENC-A is advanced from the pulse ENC-B by 90 degrees as shown in FIG. 9(*a*) when the CR motor 4 is normally rotating, i.e., when the carriage 3 is moving a main scanning direction, and the phase of the pulse ENC-A lags behind the pulse ENC-B by 90 degrees as shown in FIG. 9(*b*) when the CR motor 4 is reversely rotating. One period T of the pulses corresponds to the distance between adjacent slits of the code plate 12 (e.g., 1/180 inches (=1/180×2.54 cm)). This is equal to a period of time, in which the carriage 3 moves between the adjacent slits.

On the other hand, the rotary type encoder 13 for use in the PF motor 1 has the same construction as that of the linear type encoder 11, except that the code plate is a rotating disk which rotates in accordance with the rotation of the PF motor 1. Furthermore, in the ink jet printer, the distance between adjacent slits of a plurality of slits provided in the code plate of the encoder 13 for use in the PF motor is 1/180 inches (1/180×2.54 cm). When the PF motor 1 rotates by the distance between adjacent slits, the paper is fed by 1/1440 inches (=1/1440×2.54 cm).

Figure 10:
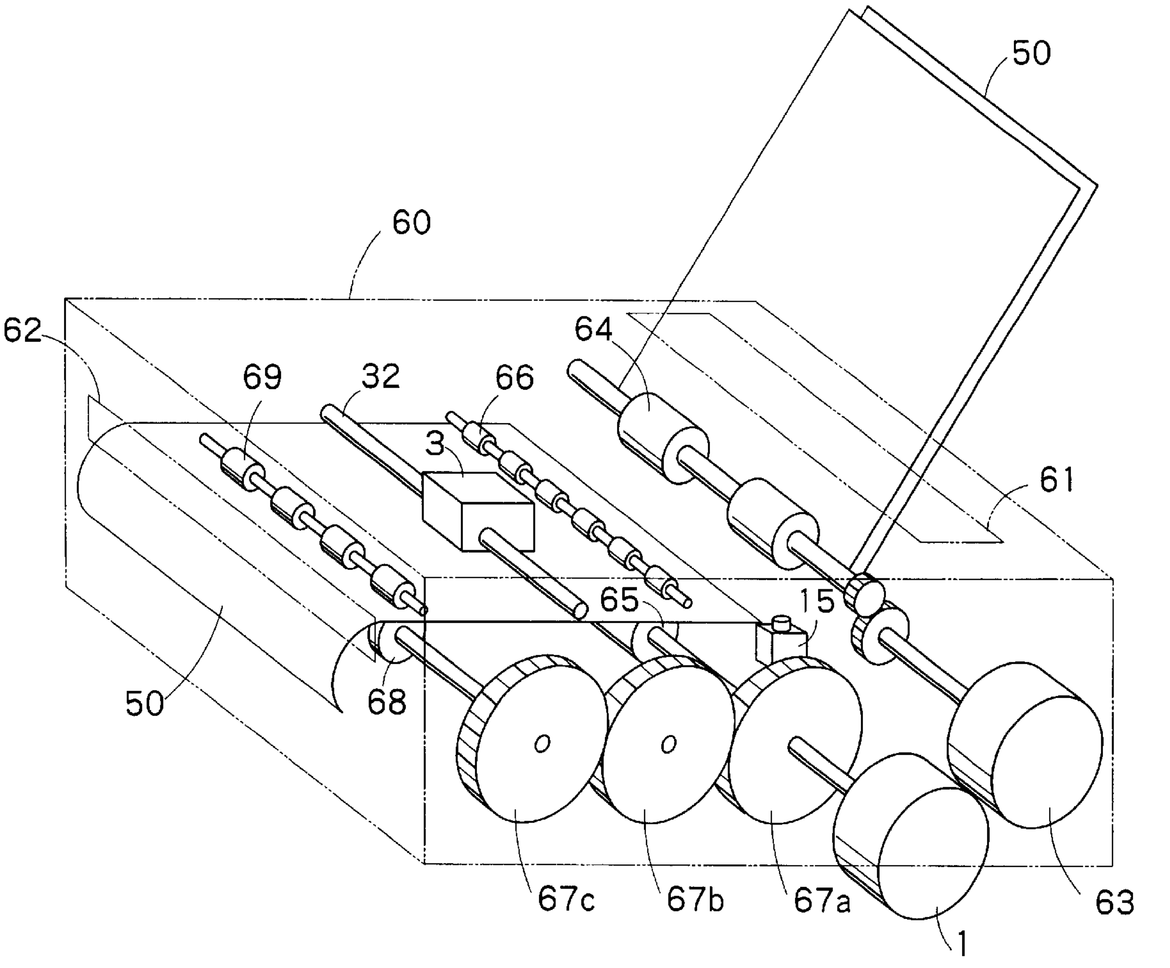
FIG. 10 is a schematic perspective view of a printer for explaining the position of a paper detecting sensor.

Referring to FIG. 10, the position of the paper detecting sensor 15 shown in FIG. 6 will be described below.

In FIG. 10, the paper 10 inserted into a paper feeding port 61 of a printer 60 is fed into the printer 60 by means of a paper feeding roller 64 which is driven by a paper feeding motor 63. The front edge of the paper 50, which has been fed into the printer 60, is detected by, e.g., an optical paper detecting sensor 15. The paper 50, the front edge of which has been detected by the paper detecting sensor 15, is fed by means of a paper feed roller 65 and a driven roller 66 which are driven by the PF motor 1.

Subsequently, ink drops from the recording head (not shown), which is fixed to the carriage 3 moving along the carriage guide member 32, to carry out a print. Then, when the paper is fed to a predetermined position, the rear edge of the paper 50, which is currently being printed, is detected by the paper detecting sensor 15. Then, a gear 67*c* is driven, via a gear 67*b*, by means of a gear 67*a* which is driven by the PF motor 1. Thus, a paper discharging roller 68 and a driven roller 69 are rotated to discharge the printed paper 50 from a paper discharging port 62 to the outside.

Figure 11:
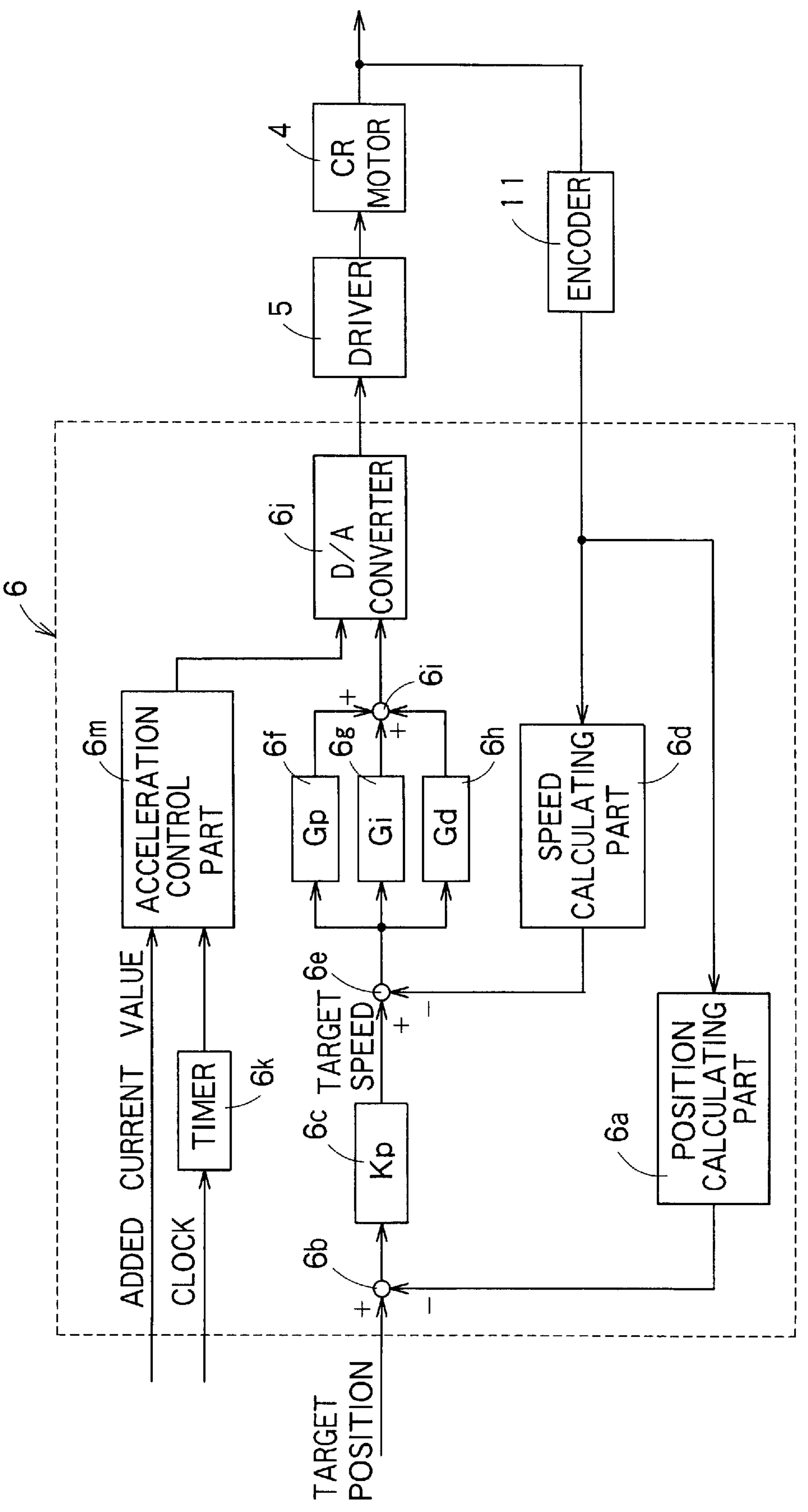
FIG. 11 is a block diagram showing the construction of a typical speed control unit for use in an ink jet printer.
Figure 12:
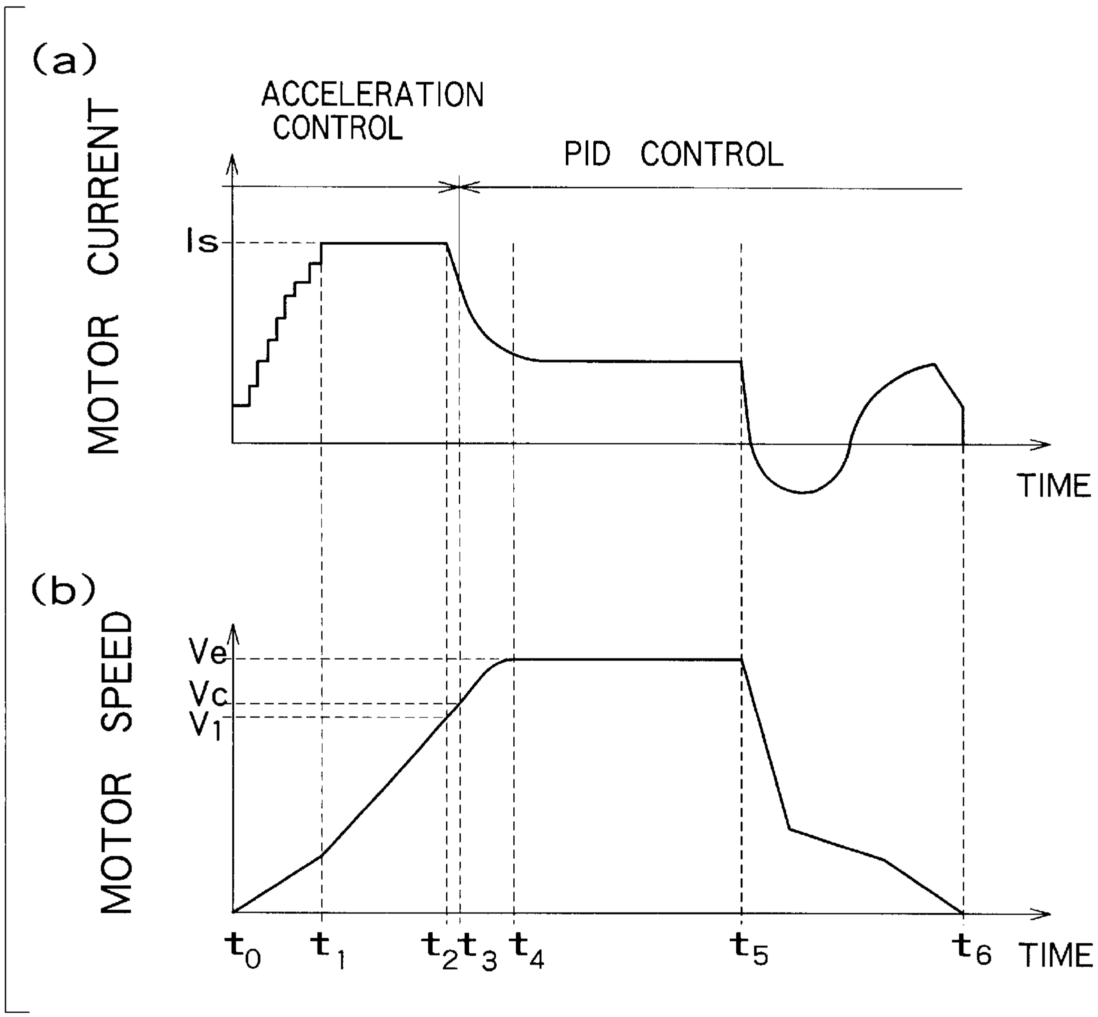
FIGS. 12(*a*) and 12(*b*) are waveform illustrations for explaining the operation of the speed control unit shown in FIG. 11.
Figure 13:
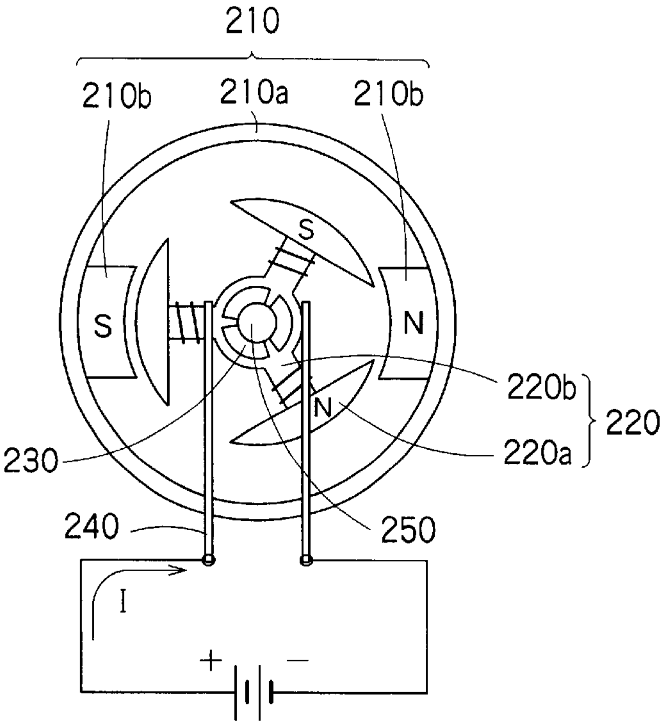
FIG. 13 is a schematic diagram showing the construction of a typical DC motor.

Referring to FIGS. 11 and 12, an example of the speed control of the DC motor 4 using the DC unit 6 shown in FIG. 6 will be described below.

The DC unit 6 comprises a position calculating part 6*a*, a subtracter 6*b*, a target speed calculating part 6*c*, a speed calculating part 6*d*, a subtracter 6*e*, a proportional element 6*f*, an integrating element 6*g*, a differentiating element 6*h*, an adder 6*i*, a D/A converter 6*j*, a timer 6*k*, and an acceleration control part 6*m*.

The position calculating part 6*a* is designed to detect the leading and trailing edges of each of the output pulses ENC-A and ENC-B of the encoder 11 to count the number of the detected edges, and to calculate the position of the carriage 3 on the basis of the counted value. In this counting, when the CR motor 4 is normally rotating, if one edge is detected, "+1" is added, and when the CR motor 4 is reversely rotating, if one edge is detected, "−1" is added. Each of the periods of the pulses ENC-A and ENC-B is equal to the distance between adjacent slits of the code plate 12, and the phase of the pulse ENC-A is different from the phase of the pulse ENC-B by 90 degrees. Therefore, the counted value "1" in the above described counting corresponds to ¼ of the distance between adjacent slits of the code plate 12. Thus, if the counted value is multiplied by ¼ of the distance between adjacent slits, it is possible to obtain the moving amount of the carriage 3 from a position corresponding to a counted value "0". At this time, the definition of the encoder 11 is ¼ of the distance between adjacent slits of the code plate 12. If the distance between adjacent slits is 1/180 inches (=1/180×2.54 cm), the definition is 1/720 inches (=1/720×2.54 cm).

The subtracter 6*b* is designed to calculate a position deviation of the actual position of the carriage 3, which is obtained by the position calculating part 6*a*, from a target position which is fed from the CPU 16.

The target speed calculating part 6*c* is designed to calculate a target speed of the carriage 3 on the basis of the position deviation which is the output of the subtracter 6*b*. This operation is carried out by multiplying the position deviation by a gain $K_p$. This gain $K_p$ is determined in accordance with the position deviation. Furthermore, the value of the gain $K_p$ may be stored in a table (not shown).

The speed calculating part 6*d* is designed to calculate a speed of the carriage 3 on the basis of the output pulses ENC-A and ENC-B of the encoder 11. This speed is obtained as follows. First, the leading and trailing edges of each of the output pulses ENC-A and ENC-B of the encoder 11 are detected, and the time interval between the edges corresponding to ¼ of the distance between adjacent slits of the code plate 12 is counted by, e.g., a timer counter. Assuming that the counted value is T and that the distance between adjacent slits of the code plate 12 is λ, the speed of the carriage is λ/(4T). Furthermore, in this preferred embodiment, the speed of the carriage is obtained by counting one period of the output pulse ENC-A, e.g., the period between the leading edge and the next leading edge, by means of a timer counter.

The subtracter 6*e* is designed to calculate a speed deviation of the actual speed of the carriage 3, which is calculated by the speed calculating part 6*d*, from a target speed.

The proportional element 6*f* is designed to multiply the speed deviation by a constant Gp to output the multiplied result. The integrating element 6*g* is designed to integrate a value which is obtained by multiplying the speed deviation by a constant Gi. The differentiating element 6*h* is designed to multiply a difference between the current speed deviation and the last speed variation by a constant Gd to output the multiplied result. Furthermore, the operations in the proportional element 6*f*, integrating element 6*g* and differentiating element 6*h* are carried out every one period of the output pulse ENC-A of the encoder 11, i.e., in synchronism with the leading edge of the output pulse ENC-A.

The outputs of the proportional element 6*f*, integrating element 6*g* and differentiating element 6*h* are added by the adder 6*i*. Then, the added result, i.e., the driving current of the CR motor 4, is fed to the D/A converter 6*j* to be converted into an analog current. On the basis of the analog current, the CR motor 4 is driven by the driver 5.

In addition, the timer 6*k* and the acceleration control part 6*m* are used for controlling acceleration, and the PID control using the proportional element 6*f*, integrating element 6*g* and differentiating element 6*h* is used for controlling the constant speed and deceleration during acceleration.

The timer 6*k* is designed to generate a timer interruption signal every a predetermined time on the basis of a clock signal which is fed from the CPU 16.

The acceleration control part 6*m* is designed to integrate a predetermined current value (e.g., 20 mA) into a target current value every time it receives the timer interruption signal, and to feed the integrated result, i.e., the target current value of the DC motor 4 during acceleration, to the D/A converter 6*j*. Similar to the PID control, the target current value is converted into an analog current by the D/A converter 6*j*. On the basis of this analog current, the CR motor 4 is driven by the driver.

The driver 5 has, e.g., four transistors. By turning each of the transistors ON and OFF on the basis of the output of the D/A converter 6*j*, the driver 5 can be selectively in (a) an operation mode in which the CR motor 4 is normally or reversely rotated, (b) a regenerative brake operation mode (a short brake operation mode, i.e., a mode in which the stopping of the CR motor is maintained), or (c) a mode in which the CR motor is intended to be stopped.

Referring to FIGS. 12(*a*) and 12(*b*), the operation of the DC unit 6 will be described below.

If a start-up command signal for starting the CR motor 4 is fed from the CPU 16 to the DC unit 6 when the CR motor 4 is stopped, a start-up initial current value $I_o$ is fed from the acceleration control part 6*m* to the D/A converter 6*j*. Furthermore, this start-up initial current value $I_o$, together with the start-up command signal, is fed from the CPU 16 to the acceleration control part 6*m*. Then, this current value $I_o$ is converted into an analog current by the D/A converter 6*j* to be fed to the driver 5, and the CR motor is started up by the driver 5 (see FIG. 12(*a*), 12(*b*)).

After the start-up command signal is received, the timer 6*k* generates a timer interruption signal every a predetermined time. Every time the acceleration control part 6*m* receives the timer interruption signal, the acceleration control part 6*m* integrates a predetermined current value (e.g., 20 mA) into the start-up initial current value $I_o$, to feed the integrated current value to the D/A converter 6*j*. Then, the integrated current value is converted into an analog current by the D/A converter 6*j* to be fed to the driver 5. Then, the CR motor is driven by the driver 5 so that the value of the current supplied to the CR motor 4 is the integrated current value, so that the speed of the CR motor 4 increases (see FIG. 12(*b*)). Therefore, the current value supplied to the CR motor is step-wise as shown in FIG. 12(*a*).

Furthermore, at this time, although the PID control system also operates, the D/A converter 6*j* selects and incorporates the output of the acceleration control part 6*m*.

The integration of the current value in the acceleration control part 6*m* is carried out until the integrated current value becomes a constant current value $I_s$. When the integrated current value becomes the predetermined value $I_s$ at time $t_1$, the acceleration control part 6*m* stops the integration, and supplies the constant current value $I_s$ to the D/A converter 6*j*. Thus, the CR motor 4 is driven by the driver 5 so that the value of the current supplied to the CR motor 4 becomes the current value $I_s$ (see FIG. 12(*a*)).

Then, in order to prevent the speed of the CR motor 4 from overshooting, the acceleration control part 6*m* controls the CR motor 4 so as to reduce the current, which is supplied to the CR motor 4, when the speed of the CR motor 4 becomes a predetermined speed $V_1$ (see time $t_2$). At this time, the speed of the CR motor 4 further increases. However, when the speed of the CR motor 4 reaches a predetermined speed $V_c$ (see time $t_3$ in FIG. 12(*b*)), the D/A converter 6*j* selects the output of the PID control system, i.e., the output of the adder 6*i*, to carry out the PID control.

That is, the target speed is calculated on the basis of the position deviation of the actual position, which is obtained from the output of the encoder 11, from the target position. In addition, the proportional element 6*f*, integrating element 6*g* and differentiating element 6*h* are operated on the basis of the speed deviation of the actual speed, which is obtained from the output of the encoder 11, from the target speed to carry out the proportional, integrating and differentiating operations. Moreover, the CR motor 4 is controlled on the basis of the sum of these calculated results. Furthermore, the above described proportional, integrating and differentiating operations are carried out in synchronism with, e.g., the leading edge of the output pulse ENC-A of the encoder 11. Thus, the speed of the DC motor 4 is controlled so as to be a desired speed $V_e$. Furthermore, the predetermined speed $V_c$ is preferably a value of 70% to 80% of the desired speed $V_e$.

Since the speed of the DC motor 4 is the desired speed $V_e$ after time $t_4$, a printing processing can be carried out. When the printing processing is completed and when the carriage 3 reaches the target position (see time $t_5$ in FIG. 12(*b*)), the DC motor 4 is decelerated to be stopped at time $t_6$.

First Preferred Embodiment

Figure 1:
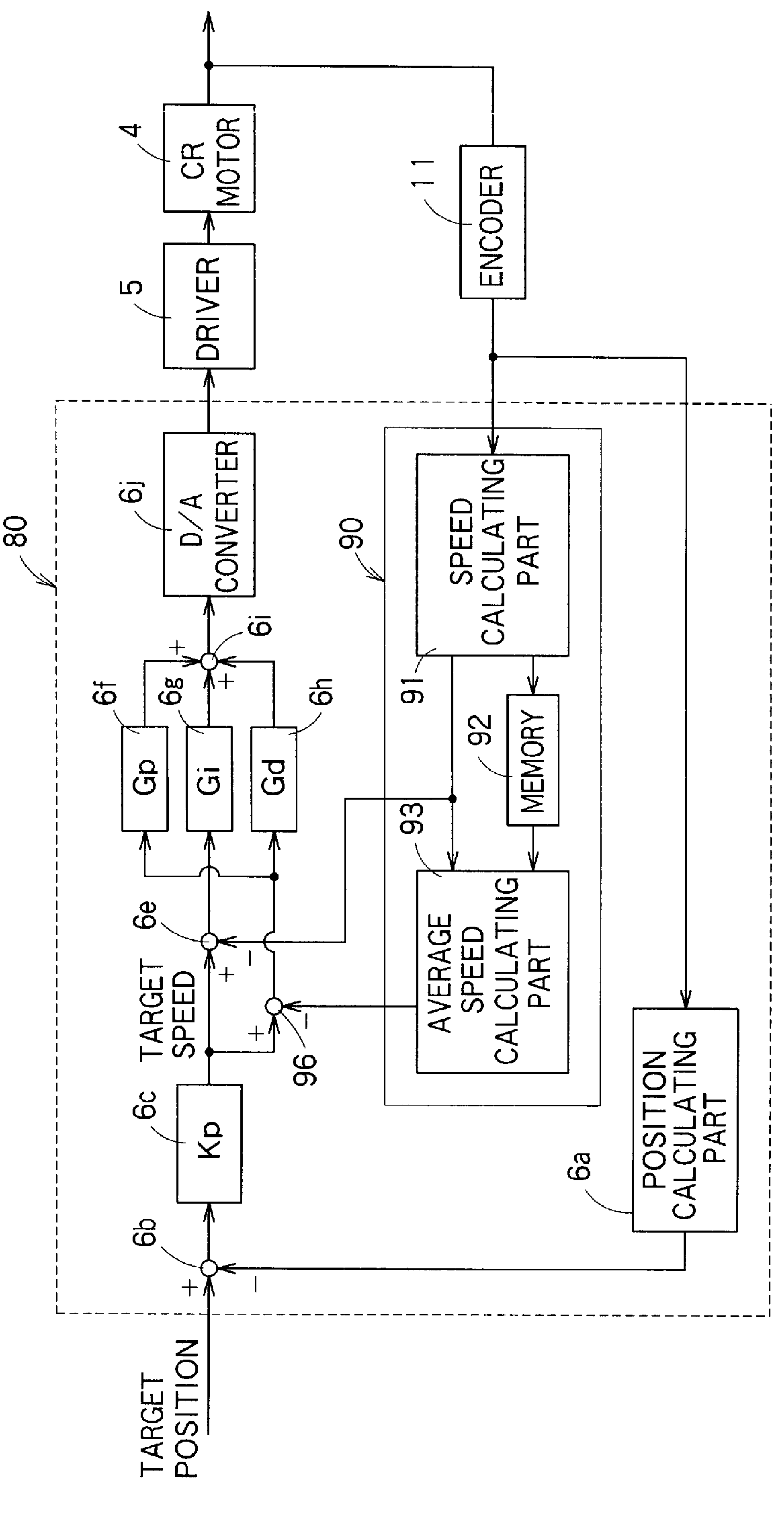
FIG. 1 is a block diagram showing the construction of the first preferred embodiment of a control unit for controlling a motor for use in a printer according to the present invention.

The construction of the first preferred embodiment of a control unit for controlling a motor for use in a printer according to the present invention is shown in FIG. 1. The control unit in this preferred embodiment is used for controlling a carriage motor 4 comprising a DC motor for use in an ink jet printer, and comprises a DC unit 80. The DC unit 80 includes an average speed measuring part 90, which is substituted for the speed calculating part 6*d* of the DC unit 6 shown in FIG. 11, and a subtracter 96 which is newly provided.

The average speed measuring part 90 comprises a speed calculating part 91, a memory 92, and an average speed calculating part 93. The speed calculating part 91 has the same construction as that of the speed calculating part 6*d* shown in FIG. 11. The speed calculating part 91 is designed to calculate a speed of the CR motor 4, i.e., a speed of the carriage 3, on the basis of the output of the encoder 11.

This operation is carried out in synchronism with the leading edge of the output pulse ENC-A of the encoder 11.

The memory 92 is designed to store therein n speed data from the last calculated result to a calculated result of n ($n \geqq 1$) before, which have been calculated by the speed calculating part 91. After the average speed calculating part 93 reads n speed data, the memory 92 is designed to store therein the current speed which is calculated by the speed calculating part 91 in place of the calculated speed of n before.

The average speed calculating part 93 is designed to calculate an average of two speed data of the current speed data, which are calculated by the speed calculating part 91, and speed data of n before, which have been stored in the memory 92.

The subtracter 6*e* is designed to calculate a speed deviation of the current speed, which is calculated by the speed calculating part 91, from a target speed, which is the output of the target speed calculating part 6*c*, to transmit the calculated speed deviation to the integrating element 6*g*.

The subtracter 96 is designed to calculate a speed deviation of the average speed, which is the output of the average speed calculating part 93, from the target speed, which is the output of the target speed calculating part 6*c*, to transmit the calculated speed deviation to the proportional element 6*f* and the differentiating element 6*h*.

The proportional element 6*f* is designed to multiply the output of the subtracter 96 by a constant Gp to transmit the multiplied result to the adder 6*i*. The integrating element 6*g* is designed to integrate a value, which has been obtained by multiplying the output of the subtracter 6*e* by a constant Gi, to transmit the integrated result to the adder 6*i*. The differentiating element 6*h* is designed to multiply a difference between the current speed deviation and the last speed deviation by a constant Gd to transmit the multiplied result to the adder 6*i*. Furthermore, the operations in the proportional element 6*f*, integrating element 6*g* and differentiating element 6*h* are carried out in synchronism with the leading edge of the output pulse ENC-A of the encoder 11.

The outputs of the proportional element 6*f*, integrating element 6*g* and differentiating element 6*h* are added up by the adder 6*i*. Then, the added result, i.e., the current for driving the CR motor 4 which causes the above described speed deviation to be zero, is fed to the D/A converter 6*j* to be converted an analog current. On the basis of this analog current, the CR motor 4 is driven by the driver 5.

In this preferred embodiment, the number n used for calculating the average speed approximates to $T_v/(2t_v)$ assuming that the period of the fluctuation in speed of the CR motor 4 is $T_v$ and that the period of the operation of the speed in the speed calculating part 91 is $t_v$. By thus causing the number n to approximate to $T_v/(2t_v)$, the fluctuation in speed of the CR motor 4 can be suppressed.

Figure 2:
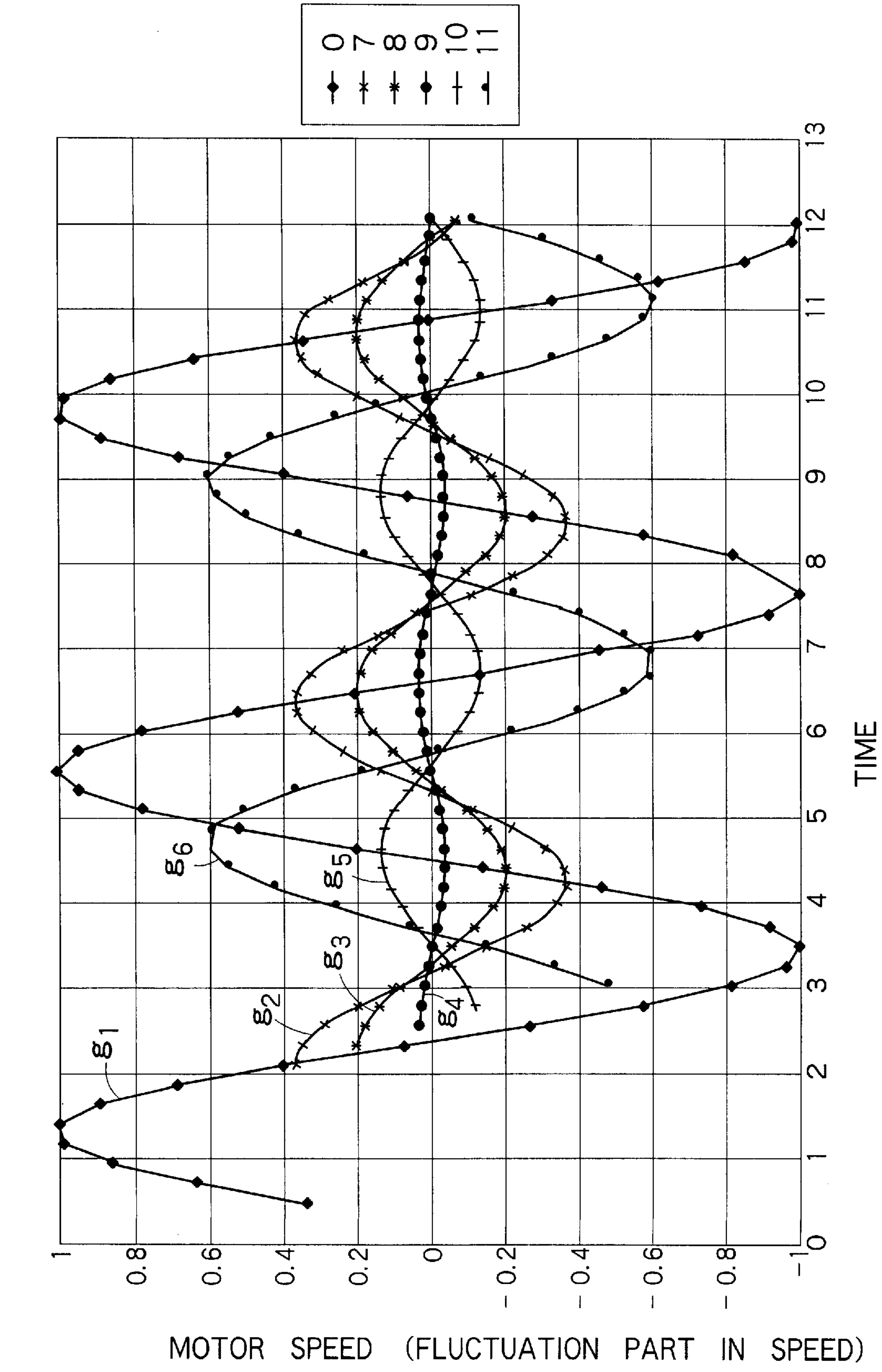
FIG. 2 is a graph showing the fluctuation in speed for explaining effects in the first preferred embodiment.
Figure 3:
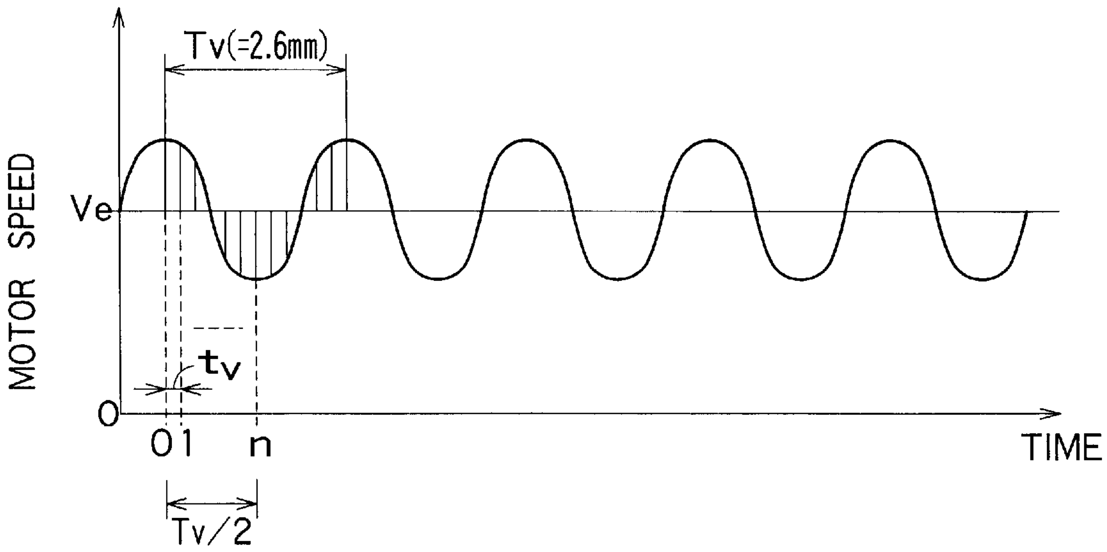
FIG. 3 is a waveform illustration showing the fluctuation in speed of a CR motor.

Referring to FIGS. 2 and 3, this will be described. In this preferred embodiment, it is assumed that the number of poles of the CR motor 4 is 5, that the effective diameter length (i.e., the pitch circle length) L of the pulley 30, mounted on the rotating shaft of the CR motor 4, for driving the timing belt 31 is 26 mm, and that the distance λ between adjacent slits of the code plate 12 of the encoder 11 is 1/180 inches (=0.14 mm). Then, the fluctuation in speed of the CR motor 4 occurs 10 times every one rotation, i.e., 10 times while the carriage 3 moves by 26 mm, so that the period $T_v$ of the fluctuation in speed is equal to a period of time, in which the carriage 3 moves by 2.6 mm (=26 mm/(2×5)).

On the other hand, the operation period $t_v$ of the speed calculating part 91 is equal to the period of the output pulse ENC-A of the encoder 11, i.e., a period of time, in which the carriage 3 moves by the distance between adjacent slits (=0.14 mm) of the code plate 12.

Therefore, in one period of the fluctuation in speed of the CR motor 4, $T_v/t_v=18.4$ (=2.6 mm/0.14 mm) speed operations are carried out by the speed calculating part 91.

In such conditions, assuming that the speed of the rotating shaft of the CR motor 4 fluctuates as a sinusoidal wave about a predetermined speed $V_e$ and that the number n used for calculating the average speed by the average speed calculating part 93 is a parameter, the state of the output of the average speed calculating part in this preferred embodiment is shown in FIG. 2. Furthermore, in FIG. 2, only the fluctuating part in speed is normalized.

In FIG. 2, a graph $g_1$ shows the state of the fluctuation in speed when n=0, i.e., when the output of the average speed calculating part 93 is coincident with the output of the speed calculating part 91, and a graph $g_2$ shows the state of the fluctuation in speed when n=7, i.e., the fluctuation in average speed of the current calculated speed and a calculated speed of 7 before. In addition, a graph $g_3$ shows the state of the fluctuation in speed when n=8, i.e., the fluctuation in average speed of the current calculated speed and a calculated speed of 8 before, and a graph $g_4$ shows the state of the fluctuation in speed when n=9, i.e., the fluctuation in average speed of the current calculated speed and a calculated speed of 9 before. Moreover, a graph $g_5$ shows the state of the fluctuation in speed when n=10, i.e., the fluctuation in average speed of the current calculated speed and a calculated speed of 10 before, and a graph $g_6$ shows the state of the fluctuation in speed when n=11, i.e., the fluctuation in average speed of the current calculated speed and a calculated speed of 11 before.

As can be seen from the calculated results shown in FIG. 2, when n=9, i.e., when n approximates to $T_v/(2t_v)$ (=9.2), the fluctuation in speed is smallest. It is considered that the reason for this is that if the product $nt_v$ of the operation period $t_v$ of the speed calculating part 91 and the number n is about half of the period $T_v$ of the fluctuation in speed of the CR motor 4, the average speed calculated by the average speed calculating part 93 approximates to zero as shown in FIG. 3, so that the fluctuation in speed decreases.

Therefore, it is possible to suppress the fluctuation in speed if the number n used for calculating the average speed meets the following expression.

$$T_v/(2t_v)-2 \leqq n < T_v/(2t_v)+2$$

Figure 4:
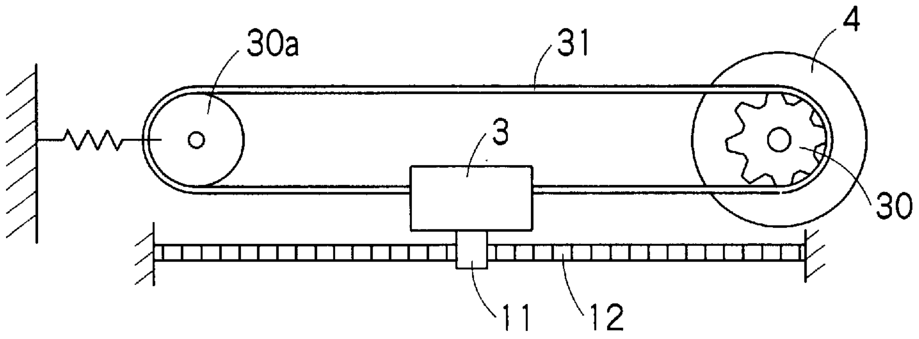
FIG. 4 is a schematic diagram for explaining the driving of a carriage.

Furthermore, in practice, as shown in FIG. 4, the timing belt 31 is stretched at a tension between the pulley 30, which is driven by the CR motor 4, and the driven wheel 30*a* which is driven by the pulley 30, so that the fluctuation in speed of the CR motor 4 is lately transmitted to the carriage 3. Therefore, as can be seen from FIG. 2, it is considered that the use of n=10, in which the phase is advanced, is more effective in the suppression of the fluctuation in speed of the CR motor 4 although the fluctuation in speed is slightly greater than that when n=9.

Therefore, assuming that the distance between adjacent slits of the code plate 12 of the encoder 11 is λ, that the pitch circle length (the effective diameter length) of the pulley 30 is L, and that the number of phases of the CR motor 4 is p, then, the number n used for calculating the average speed preferably meets the following expression.

$$L/(4p\lambda) \leqq n < L/(4p\lambda)+2$$

Furthermore, assuming that the period of the fluctuation in speed of the CR motor 4 is $T_v$ and that the operation period of the speed calculating part 91 is $t_v$, the following expression is satisfied.

$$L/(4p\lambda)=(L/(2p))/(2\lambda)=T_v/(2t_v)$$

As described above, according to this preferred embodiment, it is possible to suppress the fluctuation in speed of the CR motor.

Furthermore, while the speed deviation serving as the deviation of the average speed from the target speed has been inputted to the proportional element 6*f* and the differentiating element 6*f* in this preferred embodiment, the same effects can be obtained if the speed deviation is inputted to only the differentiating element 6*h* and if the speed deviation of the output of the speed calculating part 91 from the target speed is inputted to the proportional element 6*f* and the integrating element 6*f*. In addition, the same effects can be obtained if the speed deviation of the average speed from the target speed is inputted to all of the proportional element 6*f*, the integrating element 6*g* and the differentiating element 6*h*.

Furthermore, while the position calculating part 6*a* has counted the leading and trailing edges of the output pulses ENC-A and ENC-B of the encoder 11 to multiply the counted value by the distance between adjacent slits of the code plate 12 of the encoder 11, the leading and trailing edges of the output pulses ENC-A and ENC-B may be counted without the multiplication by the distance between adjacent slits, to be outputted. In this case, the target position is also expressed by the number of pulses, and the output of the speed calculating part 91 is the inverse number of the period of the output pulse ENC-A of the encoder 11. In addition, the average speed calculating part 93 calculates an average value of the inverse number of the period of the output pulse ENC-A to output the calculated average value.

In addition, while the average speed calculating part 93 has calculated the average speed of the current calculated speed and the calculated speed of n before in the above described first preferred embodiment, the average value (the average speed) of k+1 calculated speed data from the current calculated speed to a calculated speed of k (n>k≧1) before and k+1 calculated speed data from a calculated speed of n before and a calculated speed of n+k before may be obtained. In this case, n+k calculated speed data from the last calculated speed to the calculated speed of n+k before are stored in the memory 92. With this construction, it is possible to suppress the influence of noises.

In addition, the average speed calculating part 93 may be designed to obtain an average value of m (n−1≧m≧2) calculated speed data, which are selected from n calculated speed data from the current calculated speed to a calculated speed of n−1 before and which include the current calculated speed, and m calculated speed data which are selected from n calculated speed data from a calculated speed of n before to a calculated speed of 2n−1 and which correspond to the m calculated speed data. The calculated speed data corresponding to the current calculated speed data are the calculated speed data of n before, and the calculated speed data corresponding to the calculated speed data of k (n−1≧k≧1) before are the calculated speed data of n+k before.

In addition, in the above described preferred embodiment, while the value approximating to $T_v/(2t_v)=L/(4p\lambda)=\pi D/(4p\lambda)$ has been selected as the number n used for calculating the average speed assuming that the number of phases of the CR motor 4 is p, that the effective length of the pulley 30 is L (=πD (D is a pitch circle diameter)), that the period of the fluctuation in speed of the CR motor 4 is $T_v$, that the operation period of the speed calculating part 91 is $t_v$ and that the distance between adjacent slits of the encoder 11 is λ, n may be fixed to a predetermined value, and the pitch circle diameter D may be a value meeting the above described relationship.

Furthermore, in the ink jet printer, the speed of the carriage 3 fluctuates under the influence of (a) the fluctuation in speed of the CR motor 4, (b) the fluctuation in speed of the timing belt 31, and (c) the fluctuation in speed of the pulley. Therefore, it is not only required to suppress the fluctuation in speed of the CR motor 4, but it is also required to suppress the fluctuation in speed due to other factors. In the following second preferred embodiment, the fact that the fluctuation in speed due to other factors can be suppressed will be described below.

Second Preferred Embodiment

Figure 5:
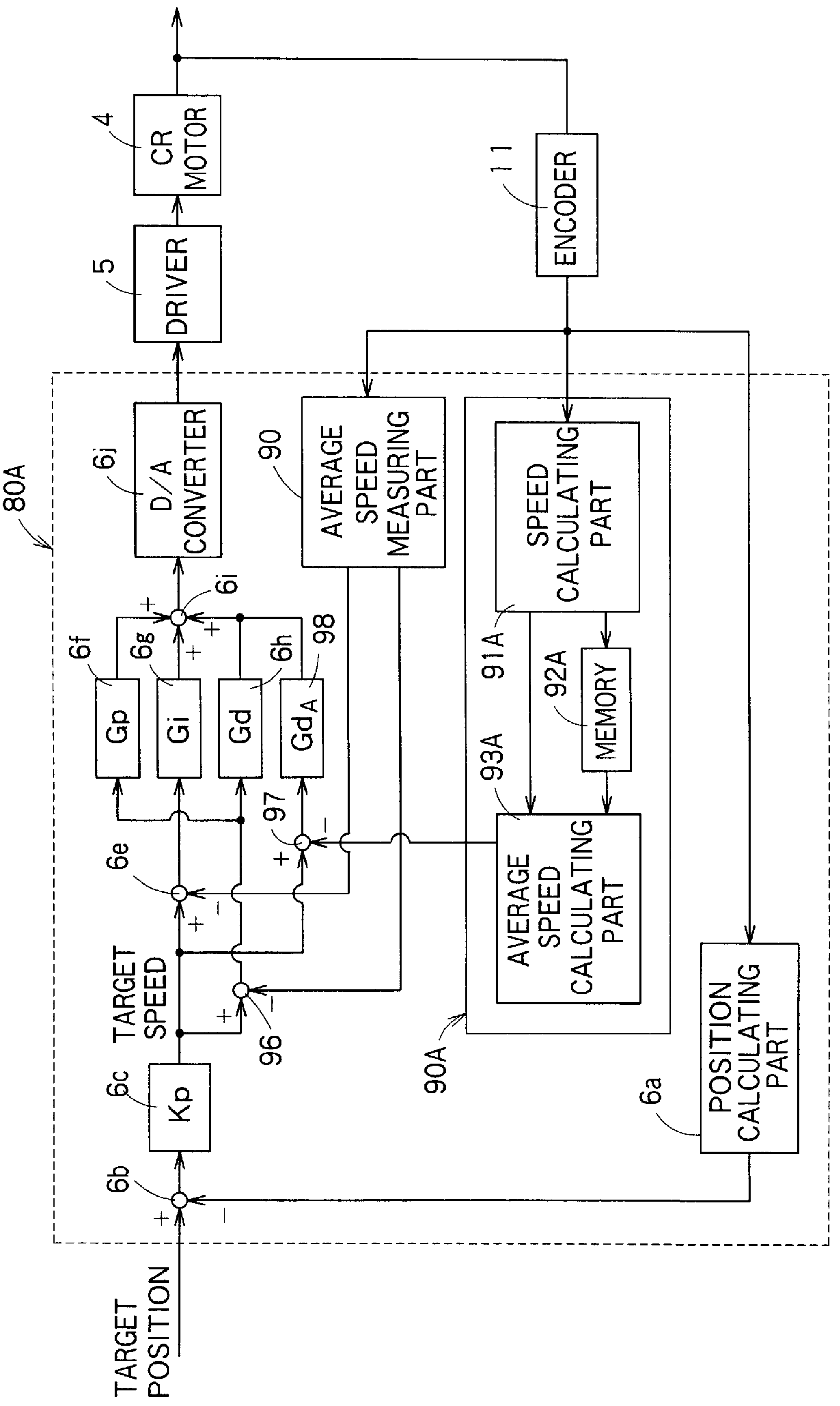
FIG. 5 is a block diagram showing the construction of the second preferred embodiment of a control unit for controlling a motor for use in a printer according to the present invention.

The construction of the second preferred embodiment of a control unit for controlling a motor for use in a printer according to the present invention is shown in FIG. 5. The control unit in this second preferred embodiment is used for controlling the speed of a CR motor of an ink jet printer. In this preferred embodiment, a DC unit 80A is substituted for the DC unit 80 of the control unit in the first preferred embodiment shown in FIG. 1. The DC unit 80A has an average speed measuring part 90A, a subtracter 97 and a differentiating element 98 which are newly added to the DC unit 80 shown in FIG. 1.

The average speed measuring part 90A has substantially the same construction as that of the average speed measuring part 90, and comprises a speed calculating part 91A, a memory 92A and an average speed calculating part 93A.

The speed calculating part 91A has the same construction as that of the speed calculating part 91, and is designed to calculate the speed of the CR motor 4, i.e., the speed of the carriage 3, on the basis of the output pulse ENC-A of the encoder 11. This operation is carried out in synchronism with the leading edge of the output pulse ENC-A of the encoder 11.

The memory 92A is designed to store therein m speed data from the last calculated result to the calculated result of m (m≧2) before, which are calculated by the speed calculating part 91A. After the average speed calculating part 93A reads data of m before, the memory 92A is designed to store therein the current calculated speed, which is calculated by the speed calculating part 91A, in place of the calculated speed of m before.

The average speed calculating part 93A is designed to calculate an average value (an average speed) of the current speed data, which are calculated by the speed calculating part 91A, and the calculated speed of m before, to transmit the calculated result to the subtracter 97.

The subtracter 97 is designed to calculate a speed deviation of the average speed, which is the output of the average speed calculating part 93A, from the target speed which is the output of the target speed calculating means 6*c*.

The differentiating element 98 is designed to multiply the difference between the current speed deviation and the last speed deviation by a constant $Gd_A$, to transmit the multiplied result to the adder 6*i*.

Then, the sum of the outputs of the proportional element 6*f*, integrating element 6*g*, differentiating element 6*h* and differentiating element 98 is calculated by the adder 6*i*. The output of the adder 6*i*, i.e., the driving current for the CR motor 4 which causes the speed deviation to be zero, is fed to the D/A converter 6*j* to be converted an analog current. On the basis of this analog current, the CR motor 4 is driven by the driver 5.

In this preferred embodiment, the number m used for calculating the average speed approximates to $T_{vA}/(2t_{vA})$ assuming that the period of the fluctuation in speed to be suppressed other than the fluctuation in speed of the CR motor 4 is $T_{vA}$ and that the operation period in the speed calculating part 91A is $t_{vA}$.

As described above, the control unit in this second preferred embodiment can suppress the fluctuation in speed of the CR motor 4, and can also suppress the fluctuation in speed due to other factors.

Furthermore, in the second preferred embodiment, the operation period of the speed calculating part 91A has been equal to the period of the output pulse ENC-A of the encoder 11. However, when the period of the fluctuation in speed to be suppressed is shorter than the period of the fluctuation in speed of the CR motor, the operation of the speed calculating part 91A is preferably carried out in synchronism with the leading and trailing edges of each of the output pulses ENC-A and ENC-B of the encoder, or on the basis of the output pulse of a higher definition encoder.

In addition, in the second preferred embodiment, the average speed calculating part 93A has calculated the average speed of the current calculated speed and the calculated speed of m before. However, the average value (the average speed) of k+1 calculated speed data from the current calculated speed to the calculated speed of k (m>k≧1) before and k+1 calculated speed data from the calculated speed of m before to the calculated speed of m+k before may be obtained. In this case, the memory 92 stores therein m+k calculated speed data from the last calculated speed to the calculated speed of m+k before.

Furthermore, the DC motor has been described in the above described first and second preferred embodiments, the present invention can also be applied to an AC motor.

Third Preferred Embodiment

Figure 14:
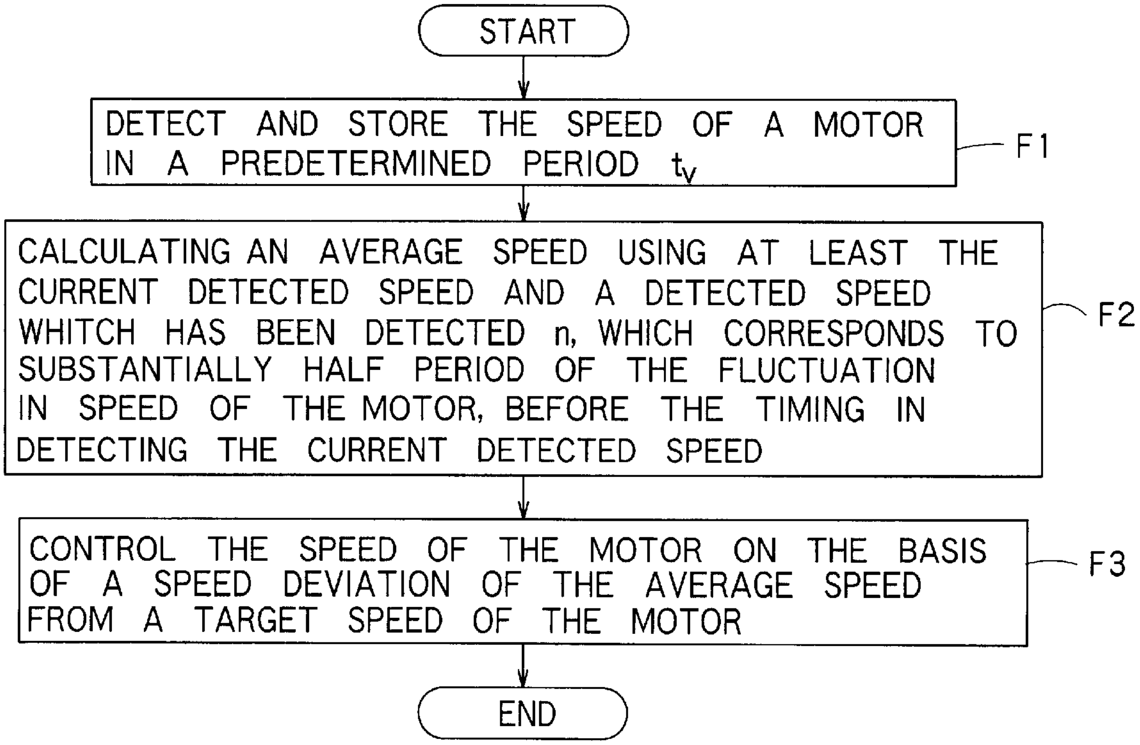
FIG. 14 is a flow chart showing a control procedure in a method for controlling a motor for use in a printer according to the present invention.

Referring to FIG. 14, the third preferred embodiment of the present invention will be described below. This third preferred embodiment relates to a method for controlling a motor for use in a printer, and the control procedure thereof is shown in FIG. 14.

First, the speed of a motor for use in a printer, e.g., the speed of a carriage motor, is detected in a predetermined period t,to be stored (see step F1 in FIG. 14). Then, an average speed is calculated using at least the current detected speed and a detected speed which has been detected n (n≧2), which corresponds to substantially half period in the fluctuation in speed of the motor, before the timing in detecting the current detected speed (see step F2 in FIG. 14). Subsequently, the speed of the motor is controlled on the basis of the speed deviation of the average speed from the target speed (see step F3 in FIG. 14).

According to the above described control method in this preferred embodiment, the influence of the fluctuation in speed is removed from the calculated average speed, so that the fluctuation in speed can be suppressed by controlling the speed of the motor on the basis of the speed deviation of the average speed from the target speed.

Furthermore, at the step of calculating the average speed, the average speed of k+1 detected speeds from the current detected speed to the detected speed of k (n>k≧0) before and k+1 detected speeds from the detected speed of n before to the detected speed of n+k before may be obtained.

In addition, at the step of controlling the speed of the motor, the motor may be controlled on the basis of the sum of the speed deviation and the output of the differentiating element which is operated on the basis of the speed deviation.

Fourth Preferred Embodiment

Figure 15:
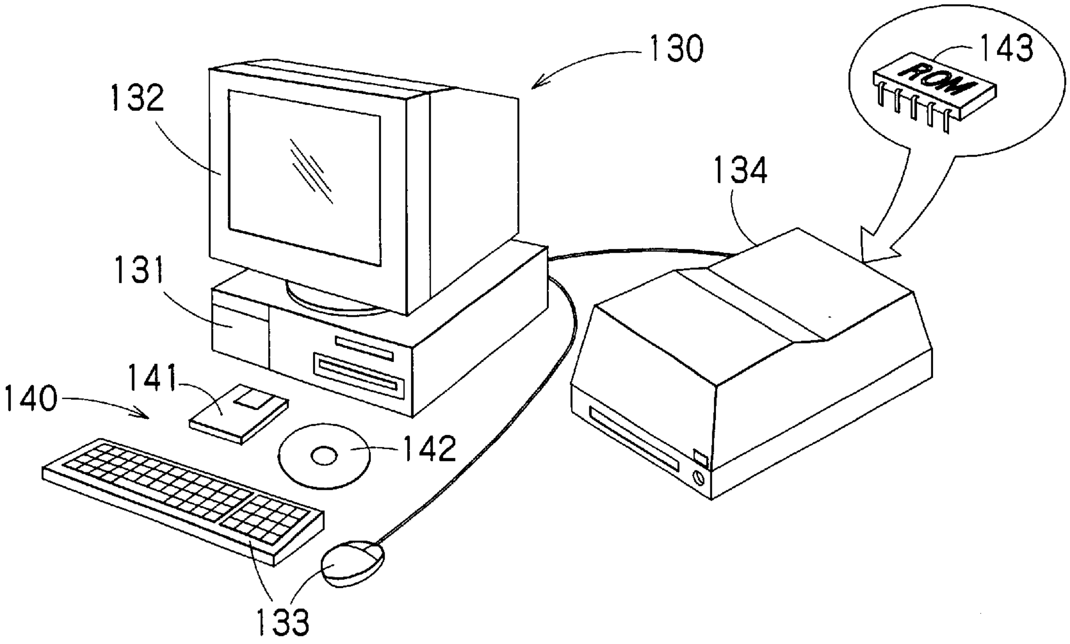
FIG. 15 is a perspective view showing an example of a computer system using a storage medium, in which a print control program has been recorded, according to the present invention.
Figure 16:
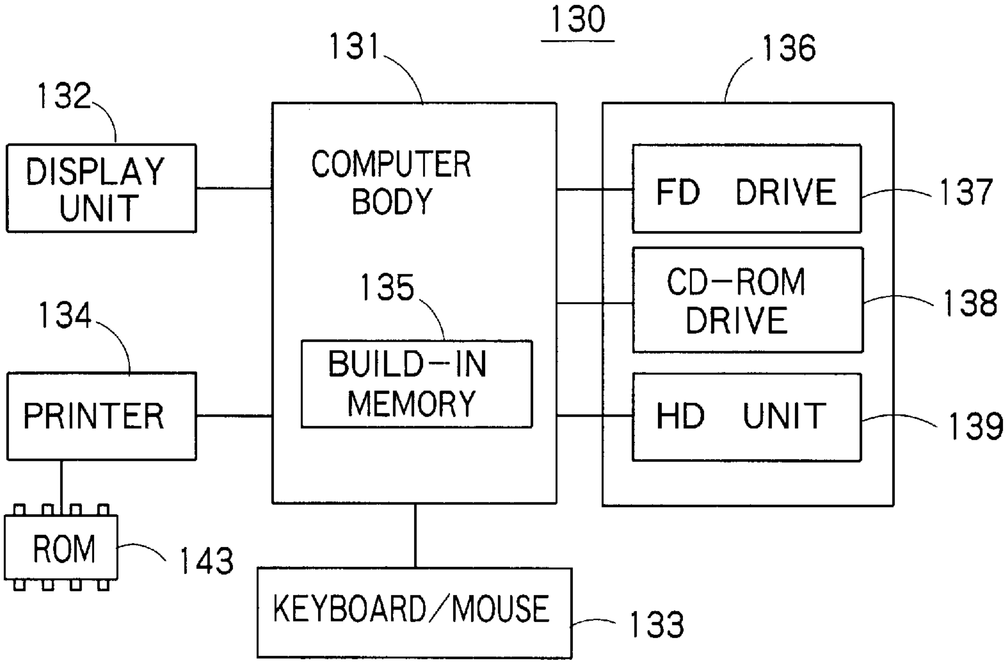
FIG. 16 is a block diagram showing an example of a computer system using a storage medium, in which a print control program has been recorded, according to the present invention.

Referring to FIGS. 15 and 16, the fourth preferred embodiment of the present invention will be described below. This preferred embodiment relates to a storage medium, in which a control program for controlling a motor for use in a printer has been stored. FIGS. 15 and 16 are a perspective view and block diagram showing an example of a computer system 130 which uses a storage medium, in which a print control program in this preferred embodiment has been recorded.

In FIG. 15, the computer system 130 comprises a computer body 130 including a CPU, a display unit 132, such as a CRT, an input unit 133, such as a keyboard or mouse, and a printer 134 for carrying out a print.

As shown in FIG. 16, the computer body 131 comprises an internal memory 135 of a RAM, and a built-in or exterior memory unit 136. As the memory unit 136, a flexible or floppy disk (FD) drive 137, a CD-ROM drive 138 and a hard disk drive (HD) unit 139 are mounted. As shown in FIG. 15, a flexible disk or floppy disk (FD) 141 which is inserted into a slot of the FD drive 137 to be used, a CD-ROM 142 which is used for the CD-ROM drive 138, or the like is used as a storage medium 140 for use in the memory unit 136.

As shown in FIGS. 15 and 16, it is considered that the FD 141 or the CD-ROM 142 is used as the storage medium for use in a typical computer system. However, since this preferred embodiment relates to a control program for controlling a motor for use in the printer 134, the control program of the present invention may be recorded in, e.g., a ROM chip 143 serving as a nonvolatile memory which is built in the printer 134. Of course, the storage medium may be any one of FDs, CD-ROMS, MOs (Magneto-Optical) disks, DVDs (Digital Versatile Disks), other optical recording disks, card memories, and magnetic tapes.

The storage medium 140 in this preferred embodiment is designed to carry out a control procedure including steps F1 through F3 shown in FIG. 14. That is, the storage medium 140 in this preferred embodiment may carry out the steps of detecting the speed of a motor in a predetermined period $t_v$, calculating an average speed using at least the current detected speed and a detected speed which has been detected n (n≧2), which corresponds to substantially half period in the fluctuation in speed of the motor, before the timing in detecting the current detected speed, and controlling the speed of the motor on the basis of a speed deviation of the average speed from the target speed.

As described above, according to the present invention, it is possible to suppress the fluctuation in speed of a motor for use in a printer.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control unit for controlling a motor in a printer, said control unit comprising:

a speed detecting part for detecting a speed of said motor in a predetermined period $t_v$;

an average speed calculating part for calculating an average speed based on, from said speed detecting part, a current detected speed and a previously detected speed which has been detected n ($n \geqq 2$) periods $t_v$ before a detecting of said current speed, $nt_v$ corresponding to a substantially half period of a fluctuation in speed of said motor;

a speed control part for controlling the speed of said motor on the basis of a speed deviation of said average speed from a target speed of said motor, wherein, assuming that a period of a fluctuation in speed of said motor is $T_v$, the number n used for calculating said average speed meets the following expression:

$$T_v/(2t_v)-2 \leqq n < T_v/(2t_v)+2.$$

2. A control unit for controlling a motor in a printer, as set forth in claim 1, wherein said average speed calculating part calculates an average speed of k+1 detected speeds from the current detected speed to a detected speed of k ($n > k \geqq 0$) before, and k+1 detected speeds from a detected speed of n before to a detected speed of k+1 before.

3. A control unit for controlling a motor in a printer, as set forth in claim 2, wherein said speed control part has a differentiating element which operates on the basis of said speed deviation of said average speed from said target speed.

4. A control unit for controlling a motor in a printer, as set forth in claim 3, wherein said speed control part has a proportional element which operates on the basis of said speed deviation of said average speed from said target speed.

5. A control unit for controlling a motor in a printer, as set forth in claim 4, wherein said speed detecting part comprises an encoder for generating an output pulse in accordance with a rotation of said motor, and a speed calculating part for calculating the speed of said motor in a period of said output pulse on the basis of said output pulse of said encoder.

6. A control unit for controlling a motor in a printer, as set forth in claim 5, wherein said motor is a carriage motor for use in an ink jet printer, and said encoder generates said output pulse in accordance with the movement of a carriage driven by said carriage motor via a pulley, which is mounted of the rotating shaft of said carriage motor, and via a timing belt which is driven by said pulley.

7. A control unit for controlling a motor in a printer, as set forth in claim 6, wherein, assuming that a distance between adjacent slits of a code plate of said encoder is N, that a pitch circle length of said pulley is L, and that a number of phases of said motor is p, said n meets the following expression:

$$L/(4p\lambda) \leqq n < L/(4p\lambda)+2.$$

8. A control unit for controlling a motor in a printer, as set forth in claim 6, wherein said speed control part further comprises:

a second speed calculating part for calculating the speed of said motor in a second predetermined period on the basis of said output pulse of said encoder;

a second average speed calculating part for calculating said average speed using at least the current calculated speed, which is calculated by said second speed calculating part, and a calculated speed which has been m ($m \geqq 2$) before; and a second differentiating element which operates on the basis of a speed deviation of the output of said second average speed calculating part from said target speed.

9. A control unit for controlling a motor in a printer, as set forth in claim 2, wherein said motor is a DC motor.

10. A method for controlling a motor in a printer, said method comprising the steps of:

detecting a speed of said motor in a predetermined period $t_v$;

calculating an average speed based on, from said detecting, a current detected speed and on a previously detected speed which has been detected n ($n \geqq 2$) periods $t_v$ before said detecting of said current speed, $nt_v$ corresponding to a substantially half period of a fluctuation in speed of said motor;

controlling the speed of said motor on the basis of a speed deviation of said average speed from a target speed of said motor, wherein, assuming that a period of a fluctuation in speed of said motor is $T_v$, the number n used for calculating said average speed meets the following expression:

$$T_v/(2t_v)-2 \leqq n < T_v/(2t_v)+2.$$

11. A method for controlling a motor in a printer, as set forth in claim 10, wherein said calculating said average speed calculates an average speed of k+1 detected speeds from the current detected speed to a detected speed of k ($n > k \geqq 0$) before, and k+1 detected speeds from a detected speed of n before to a detected speed of k+1 before.

12. A method for controlling a motor in a printer, as set forth in claim 11, wherein said controlling the speed of said motor is based on a sum of said speed deviation and on an output of a differentiating element which operates based on said speed deviation.

13. A method for controlling a motor in a printer, as set forth in claim 12, wherein said detecting the speed of said motor includes calculating a speed of said motor in a period of an output pulse of an encoder, which generates said output pulse in accordance with the rotation of said motor, based on said output pulse of said encoder.

14. A method for controlling a motor in a printer, as set forth in claim 13, wherein said motor is a carriage motor for use in an ink jet printer.

15. A method for controlling a motor in a printer, as set forth in claim 10, wherein said motor is a DC motor.

* * * * *